United States Patent Office 3,736,293
Patented May 29, 1973

3,736,293
POLYETHERS CONTAINING REPEATING PERCHLOROAROMATIC UNITS
Ernest R. Novak, Wilmington, Del., assignor to E. I. du Pont de Nemours and Company, Wilmington, Del.
No Drawing. Continuation of abandoned application Ser. No. 41,063, May 27, 1970, which is a continuation-in-part of application Ser. No. 847,763, Aug. 5, 1969. This application Aug. 23, 1971, Ser. No. 174,225
Int. Cl. C08g 23/00
U.S. Cl. 260—61                     12 Claims

ABSTRACT OF THE DISCLOSURE

Normally solid polyethers of the structure $$\text{(Ar—A—Ar'—A')}$$

wherein —A— and —A'— are —O— or —S—, —Ar— is a divalent perchlorinated aromatic group and —Ar'— is a divalent aromatic group. The process of producing the above polymers by reacting a compound of the formula Cl—Ar—Cl with a compound of the formula H—A—Ar'—A'—H at from 25 to 250° C. in the liquid phase and preferably in a solvent for one or both of the monomers.

This application is a continuation of application Ser. No. 41,063, filed May 27, 1970, now abandoned, which was in turn a continuation-in-part of application Ser. No. 847,763, filed Aug. 5, 1969, now abandoned.

BACKGROUND OF THE INVENTION

In the past, aromatic polyethers such as those described in British Pat. No. 1,078,234 and Belgian Pat. No. 687,344 have suffered from a lack of oxidative stability and flame resistance. In accordance with the present invention these problems are overcome through the use of a polyether in which one of the starting monomers is an arylene group in which all of the aromatic carbon atoms are chlorinated which surprisingly can be made into a high molecular weight polymer having improved oxidative and flame resistance while retaining excellent high temperature mechanical characteristics.

SUMMARY OF THE INVENTION

The present invention relates to polymers containing certain perchlorinated aromatic units which polymers have high thermal stability, and excellent retention of mechanical properties at high temperatures as well as to a process for producing these polyethers. Generally, these polymers which are polyethers or polythioethers have the formula (Ar—A—Ar'—A') wherein —A— and —A'— are —O— or —S—, —Ar— is a perchlorinated divalent aromatic group containing from 10 to 24 aromatic carbon atoms, having at least two aromatic rings, and wherein any bridges between aromatic nuclei are of not more than one atom. —Ar'— is a divalent group containing from 6 to 24 aromatic carbon atoms wherein any bridges between aromatic nuclei are not more than one atom. As used herein aromatic group includes benzene based groups such as phenylene, biphenylene, triphenylene, tetraphenylene and condensed benzene ring groups such as naphthylene, or phenanthrylene. This language is not intended herein to include heterocyclic groups. By a "bridge of not more than one atom" is meant the means of direct bonding between rings. In the case of bonding through one atom, other atoms may be attached to the bridging atom. Thus, —S—, $$-\overset{O}{\underset{\parallel}{S}}- \text{ and } -\overset{O}{\underset{\parallel}{\underset{O}{S}}}-$$

are included but $$-O-\overset{O}{\underset{\parallel}{\underset{O}{S}}}-O- \text{ or } -CH_2-CH_2-$$

is excluded by this definition.

Preferred —Ar— groups are selected from the class consisting of

[perchlorinated biphenylene and perchlorinated terphenylene structures]

and

[perchlorinated diphenyl-R structure]

wherein R has the meaning defined below.

Preferred —Ar'— groups are selected from the class consisting of

[phenylene, biphenylene, naphthylene structures]

and

[diphenyl-R' structure]

The bridge —R— is selected from the class consisting of —O—, —S—, $$-\overset{CF_3}{\underset{CF_3}{\overset{|}{C}}}-, \quad -\overset{O}{\underset{\parallel}{C}}-, \quad -\overset{O}{\underset{\parallel}{S}}- \text{ and } -\overset{O}{\underset{\underset{O}{\parallel}}{S}}-$$

and the bridge R' is selected from the class consisting of R and $$CH_3-\overset{|}{\underset{|}{C}}-CH_3.$$

These polymers are prepared by reacting substantially equimolar portions of a compound of the formula Cl—Ar—Cl with at least one compound of the formula H—A—Ar'—A'—H wherein —A— and —A'— are oxygen or sulfur and —Ar— and —Ar'— have the meanings defined above, at from 25 to 250° C. in the presence of a base. In carrying out this reaction the chlorine in the Cl—Ar—Cl are displaced from perchlorinated nuclei to form a polymer containing repeating units of the structure (Ar—A—Ar'—A'). Pressure is not an important variable and any pressure sufficient to maintain the monomers in the liquid state at the temperature being used is satisfactory. The polymers of the present invention have inherent viscosities above 0.1 and preferably above 0.3 as measured from a solution of 0.5 g. of polymer in 100 ml. of solvent such as benzene at 30° C.

The process is preferably carried out in a solvent for at least one and preferably both of the monomers. Generally, concentrations of 10 to 300 and preferably from 50 to 250 grams of monomer per liter of solvent are satisfactory. Suitable solvents include dimethylacetamide, dimethylformamide, dimethylsulfoxide, tetramethylenesulfone, and hexamethylphosphoramide which may be used alone or in combination with a compound such as benzene, toluene, or a partly chlorinated aromatic compound.

Suitable bases for use in the present process are alkali metal, alkaline earth or quaternary ammonium salts of weak acids. Suitable bases include potassium carbonate, sodium carbonate, magnesium oxide, sodium hydroxide, and calcium hydroxide. Besides this in situ contacting of the diphenol with the base, a pre-prepared salt of the formula M—A—Ar'—A'—M where M is an alkali metal, alkaline earth metal or quaternary ammonium ion and —A—, —A'— and —Ar'— have the meanings defined above, may be used directly.

If desired, the polymer may be capped with phenol to improve the thermal stability.

The polymers of the present invention are substantially linear and are characterized in having high thermal stability along with excellent retention of physical properties at elevated temperatures. Generally, the preferred polymers of the present invention have second order glass transition temperatures in excess of 260° C. The glass transition temperatures are determined on a Du Pont 900 Differential Thermal Analyzer, following the procedure described in the instruction manual. The determinations are made in an atmosphere of nitrogen, in 4 mm. glass sample tubes, using a nominal programming rate of 20–30 degrees per minute. The glass transition temperature is obtained from the intercept of the tangents to the curve. Values shown in the parent application were obtained from the minimum of the curve, which gives a somewhat higher value. In either method of interpretation some sample-to-sample variation does occur.

The polymers of the present invention are useful in forming films for high temperature applications, electrical insulation, and structural parts for high temperature applications. The polymers of the present invention have a low flammability and generally exhibit a limiting oxygen index of above 0.4 and preferably above 0.6 as measured by Oxygen Index Flammability Test, Jack L. Isaacs, reported in 27th Annual Technical Conference S.P.E. Papers, vol. XV, 143–147.

DESRIPTION OF THE PREFERRED EMBODIMENTS

EXAMPLE I

A 500 ml. flask equipped with a mechanical stirrer, nitrogen gas inlet tube, thermometer and a water separator trap (known as a Dean-Stark apparatus and described on page 429 of "A Textbook of Practical Organic Chemistry" by Vogel., published by John Wiley & Son, New York, N.Y., 3rd ed., 1962) is charged with 19.9464 g. of perchlorobiphenyl, 9.0741 g. of 2,2-di(p-hydroxyphenyl)propane, 0.0472 g. phenol, 150 ml. of dimethylacetamide, and 50 ml. of toluene. The reaction mixture is heated to reflux with toluene being added or drained from the trap as required to maintain a reflux temperature of 130° C. as

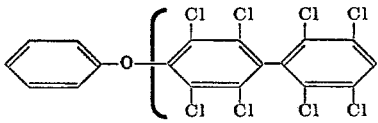

measured in the reaction mixture. When most of the monomers dissolve (about 20 minutes) 10.8 g. of ground anhydrous $K_2CO_3$ is added. One hour later another 10.0 g. of $K_2CO_3$ is added. The reaction is continued at 130° C. for an additional four hours. The resulting polymer solution is diluted with an additional 50 ml. of toluene, and filtered while still hot. The viscous solution is poured into 1 liter of methanol rapidly stirred at ambient temperature in a blender. The polymer precipitates as a finely-divided white powder which is filtered, washed with methanol and dried. The yield of polymer is 26.0 g.

Calculated analysis for $C_{27}H_{14}Cl_8O_2$ (percent): C, 49.58; H, 2.16; Cl, 43.36. Found (percent): C, 49.64; H, 2.43; Cl, 42.88; C, 49.59; H, 2.31; Cl, 42.76.

The polymer appears to have a Tg (second order glass transition temperature) of about 270° C. (above 260° C. as measured from a tensile modulus vs. temperature plot), and 278° C.±5° C. as measured by differential thermal analysis. The polymer has an inherent viscosity of 0.44 as measured from 0.5 g. of polymer in 100 ml. of benzene at 30° C.

The polymer is compression molded at 330° C. under about 5,000 p.s.i. for three minutes to produce a clear transparent film having a density of 1.42 g./cc. The physical properties of the polymer are reported in Table I.

TABLE I

| | Tensile strength, p.s.i. | Ultimate elongation, percent | Tensile modulus, p.s.i. |
|---|---|---|---|
| Temperature, ° C.: | | | |
| 25 | 11,900 | 19 | 277,000 |
| 200 | 5,000 | 9 | 218,000 |
| 252 | 2,400 | 41 | 143,000 |
| 272 | 312 | 390 | 600 |

The limiting oxygen index of the polymer is 0.70. The polymer is believed to have the structure

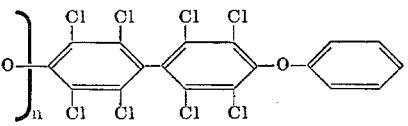

EXAMPLE II

The 500 ml. flask equipped as in Example I is charged with 9.9732 g. of perchlorobiphenyl, 3.7054 g. of p,p'-biphenol, 0.0188 g. of phenol, 70 ml. of dimethylacetamide, 30 ml. of chlorobenzene, and 30 ml. of benzene. The mixture is heated to reflux and more benzene is added to adjust the reflux temperature to 135° C. Five g. of anhydrous $K_2CO_3$ is added. 1.5 hours later an additional 5.0 g. of anhydrous $K_2CO_3$ is added. Four hours later the reaction is shut down and the product worked up as in Example I. There is obtained 11.7 g. of polymer having an inherent viscosity of 0.80 as measured from a solution of 0.5 g. of polymer in 100 ml. of benzene at 30° C. The polymer has a second order glass transition temperature of 340° C.±10° C. as determined by differential thermal analysis.

The calculated analysis for $C_{24}H_8Cl_8O_2$ (percent): C, 47.11; H, 1.32; Cl, 46.35. Found (percent): C, 47.26; H, 1.48; Cl, 45.46. C, 47.23; H, 1.42; Cl, 45.46.

The polymer is compression molded into a slightly discolored transparent film by pressing under about 5,000 p.s.i. at 375° C. for 4 minutes. At 25° C. the film has a tensile strength of 10,200 p.s.i., a tensile modulus of 260,000 p.s.i., and an ultimate elongation of 18%. The polymer is believed to have the formula

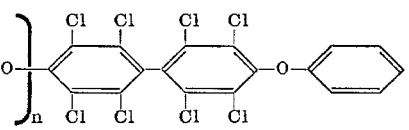

EXAMPLE III

Example II is repeated except the charge to the flask is 9.9732 g. of perchlorobiphenyl, 2.2022 g. of hydroquinone, 70 ml. of dimethylacetamide (DMAC), 30 ml. of o-dichlorobenzene and 10 ml. of benzene. There was obtained 9.3 g. of polymer having an inherent viscosity of 0.44 as measured from a solution of 0.5 g. of polymer in 100 ml. of benzene at 30° C. The second order glass transition temperature of the polymer as measured by differential thermal analysis is 305° C.±10° C. A slightly yellowish transparent film is molded at 350° C. and about 5,000 p.s.i. for 4 minutes. At 25° C. the film has a tensile strength of 10,000 p.s.i., a tensile modulus of 225,-

000 p.s.i. and an ultimate elongation of 7%. The polymer is believed to have the structure

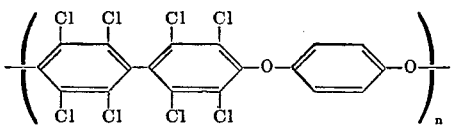

EXAMPLE IV

Example I is repeated except the charge to the reactor is 9.9732 g. of perchlorobiphenyl, 6.7244 g. of

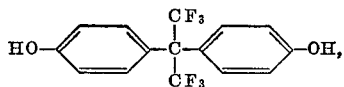

75 ml. of dimethylacetamide and 25 ml. of toluene. Anhydrous $K_2CO_3$ (5.4 g.) is added, one hour later an additional 5.0 g. of anhydrous $K_2CO_3$ is added. Five hours later the reaction is shut down and the polymer worked up as in Example I. There is obtained 15.7 g. of polymer having an inherent viscosity of 0.40 as measured from a solution of 0.5 g. of polymer in 100 ml. of benzene at 30° C. The second order glass transition temperature of the polymer as measured by differential thermal analysis is 270° C.±20° C. The polymer is believed to have the structure

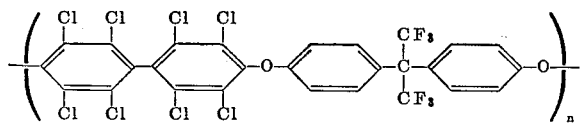

EXAMPLE V

A 1000 ml. flask equipped as in Example I is charged with 49.868 g. of perchlorobiphenyl, 25.07 g. 4,4'-dihydroxydiphenylsulfone, 300 ml. of DMAC, 180 ml. of o-dichlorobenzene, 80 ml. of benzene, 70 ml. of toluene and 40 ml. of monochlorobenzene. The mixture is heated to reflux and 50 ml. of distillate, containing a small amount of water are drained through the separator trap and discarded. 27.6 g. of anhydrous $K_2CO_3$ are added in portions over a period of 5 minutes. The reaction is continued for 2 hours at a reflux temperature of 143° C. At this point, 4 ml. of water has been collected in the trap and the temperature is raised to 150° C. by draining an additional 25 ml. of distillate. After an additional hour, the reaction is terminated by introducing a rapid stream of methyl chloride and worked up as described in Example I. There is obtained 65.6 g. of polymer having an inherent viscosity of 0.48 as measured from a solution of 0.5 g. of polymer in 100 ml. of dimethylacetamide at 35° C.

The polymer is believed to have the structure

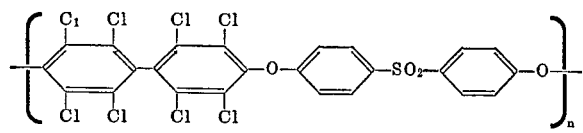

EXAMPLE VI

Example I is repeated except the change to the flask is 9.9732 g. perchlorobiphenyl, 2.2022 g. resorcinol, 75 ml. DMAC, 20 ml. chlorobenzene, 30 ml. toluene and 10 ml. benzene. Anhydrous $K_2CO_3$ (5.2 g.) is added, one hour later an addtional 3.0 g. of anhydrous $K_2CO_3$ is added. Four hours later the reaction is worked up as in Example I. There is obtained 10.7 g. of white polymer having an inherent viscosity of 0.22 as measured from a solution of 0.5 g. of polymer dissolved in 100 ml. of benzene at 30° C. The second order glass transition temperature of this polymer as measured by differential thermal analysis is 252° C.±15° C. The polymer is believed to have the structure

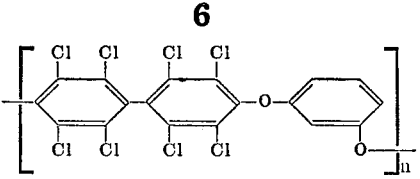

EXAMPLE VII

Perchlorodiphenyl ether is prepared by chlorinating phenyl ether using iron powder to give catalyst, gaseous chlorine as the chlorinating agent, and perchloroethylene as the solvent. A 250 ml. flask equipped with a mechanical stirrer, nitrogen gas inlet tube, thermometer and a water separator trap (described in Example I) is charged with 10.30 g. of perchlorodiphenyl ether, 4.56 grams of 2,2-di(p-hydroxyphenyl)propane, 75 ml. of dimethylacetamide, and 25 ml. of a 1/1 benzene/toluene mixture. The reaction mixture is heated to reflux with toluene being added and benzene/toluene being removed from the trap to maintain a reflux temperature of 130° C. as measured in the reaction mixture. When the monomer dissolves 4.4 grams of ground anhydrous $K_2CO_3$ are added. The reaction is continued at 130° C. for an additional 3.5 hours. The resulting polymer solution is filtered hot and then poured into 500 ml. of methanol rapidly stirred at ambient temperature in a blender. The polymer precipitates as a finely-divided white powder which is filtered, washed with methanol and dried. The yield of polymer, having an inherent viscosity of 0.12 as measured from a 0.5 g. solution of polymer in 100 ml. of benzene at 30° C., is 11.0 g. The polymer is believed to have the structure

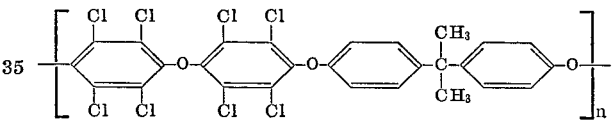

EXAMPLE VIII

A 500 ml. flask, equipped as in Example I, is charged with 9.9732 g. of perchlorobiphenyl, 4.2844 g. of 4,4'-dihydroxybenzophenone, 80 ml. of DMAC, 30 ml. of benzene and 30 ml. of chlorobenzene. The reaction mixture is heated to reflux, 129–131° C. When most of the monomers have dissolved, 5.2 g. of ground anhydrous $K_2CO_3$ is added. Fifty-five minutes later another 5.0 g. of $K_2CO_3$ is added. The reaction is continued for an additional two hours and twenty minutes. The product is worked up as in Example I. There is obtained 12.3 g. of white polymer, having an inherent viscosity of 0.26, as measured from solution of 0.5 g. of polymer in 100 ml. benzene at 30° C.

The polymer is believed to have the structure

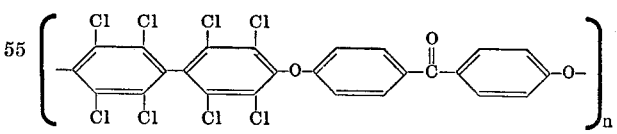

EXAMPLE IX

A 3 l. flask equipped with a mechanical stirrer, nitrogen inlet, thermometer, and a 12" x 1" Vigreux column connected to a distillation head, is charged with 252.3 g. of perchlorobiphenyl, 114.1 g. of 2,2-di(p-hydroxyphenyl) propane, one liter of DMAC and one liter of chlorobenzene. The mixture is heated to its boiling point, 145–147° C. as measured in the reaction mixture. At this temperature, the monomers dissolve completely an 138 g. of ground anhydrous $K_2CO_3$ is added. Over a 90-minute period of polymerization, 420 ml. of distillate comprising material boiling in the range of 125–136° C. is collected. The distillate separates into two layers, a lower layer of about 400 ml. and an upper layer of about 20 ml. The product is worked up as in Example 1. There is obtained 224 g. of polymer having an inherent viscosity of 0.36 as measured from 0.5 g. of polymer in 100 ml. of benzene at 35° C. and this polymer is believed to have the structure shown below.

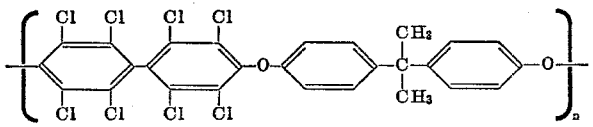

EXAMPLE X

A 1 l. flask equipped as in Example IX, is charged with 75.5255 g. of perchlorobiphenyl, 11.1000 g. of hydroquinone, 5.4275 g. of resorcinol, 300 ml. of chlorobenzene and 300 ml. of DMAC. The reaction mixure is heated to its boiling point, 146° C. as measured in the mixture. When most of the monomers have dissolved, 25 g. of $K_2CO_3$ is added. Thirty-five minutes later another 5 g. of $K_2CO_3$ is added. At this time 50 ml. of distillate has collected. Forty-five minutes later, 40 ml. of chlorobenzene is added; an additional 50 ml. of chlorobenzene is added; and additional 70 ml. of distillate has collected. The product is worked up ten minutes later as in Example I. There is obtained 80 g. of polymer, having an inherent viscosity of 0.28 as measured from a solution of 0.5 g. of polymer in 100 ml. of benzene at 35° C. The polymer has a second order glass transition temperature of 289° C.±10° C. as determined by differential thermal analysis.

EXAMPLE XI

A two liter flask, equipped as in Example IX, is charged with 100.6961 g. of perchlorobiphenyl, 11.0434 g. of hydroquinone, 11.1400 g. of resorcinol, 500 ml. of chlorobenzene and 400 ml. of DMAC. The mixture is heated to its boiling point, 142° C. When most of the monomers have dissolved, 45 g. of $K_2CO_3$ and 100 ml. of chlorobenzene are added. The temperature in the reaction mixture is maintained below 147° C., by addition of more chlorobenzene as needed. The polymerization is carried out for three hours; 350 ml. of distillate is collected during this time. The product is isolated as in Example I. There is obtained 101.3 g. of polymer, having an inherent viscosity of 0.34, as measured from a solution of 0.5 g. of polymer in 100 ml. benzene at 35° C. The polymer has a second order glass transition temperature of 283° C.±20° C. as determined by differential thermal analysis.

EXAMPLE XII

Perchlorodiphenylsulfide is prepared following the procedure described in Example VII. A 1 l. flask equipped as in Example IX, is charged with 10.614 g. of perchlorodiphenylsulfide, 4.566 g. of 2,2-di(p-hydroxyphenyl)propane, 75 ml. of hexamethylphosphoramide, 50 ml. of o-dichlorobenzene and 50 ml. of toluene. The reaction mixture is heated to 130° C. as measured in the mixture and 2.764 g. of ground anhydrous $K_2CO_3$ together with 25 ml. of chlorobenzene is added. Forty-five minutes later, most of the monomers have dissolved and 32 ml. of distillate has collected. At this time another 4.3 g. of $K_2CO_3$ is added. One hour later, 45 ml. of toluene is added; an additional 58 ml. of distillate has collected and the temperature, as measured in the mixture, is 159° C. During the following two hours, the temperature of the mixture is maintained at 170–180° C. and an additional 15 ml. of distillate is collected. The mixture is cooled to 150° C. and methyl chloride is passed through the reaction mixture for ten minutes. An additional 100 ml. of hexamethylphosphoramide is added and the mixture is cooled to 50–40° C. The product is worked up as in Example I. There is obtained 8.1 g. of polymer, having an inherent viscosity of 0.18 as measured from a solution of 0.5 g. of polymer in 100 ml. of hexamethylphosphoramide at 35° C.

The polymer is believed to have the structure

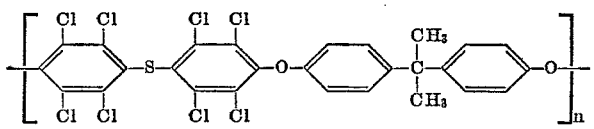

EXAMPLE XIII

A 1 l. flask equipped as in Example IX, is charged with 14.252 g. of perchloro-p-terphenyl, 4.566 g. of 2,2-di-(p-hydroxyphenyl)propane, 75 ml. of DMAC and 75 ml. of chlorobenzene. The reaction mixture is heated to reflux, 145° C., as measured in the mixture and 2.764 g. of ground anhydrous $K_2CO_3$ together with 25 ml. of chlorobenzene is added. After thirty minutes most of the monomers have dissolved and 35 ml. of distillate has collected. Thirty minutes later, another 4.3 g. of $K_2CO_3$ and 50 ml. of chlorobenzene is added. During the following hour, the temperature of the mixture is maintained at 145° C. and 50 ml. of distillate is collected. Fifteen minutes later, 50 ml. of o-dichlorobenzene is added and methyl chloride is passed through the reaction mixture for ten minutes. The mixture is further diluted with 100 ml. of o-dichlorobenzene, cooled to room temperature and worked up as in Example I. There is obtained 9.7 g. of polymer, having an inherent viscosity of 0.79 as measured from a solution of 0.5 g. of polymer in 100 ml. of benzene at 35° C.

The polymer is believed to have the structure

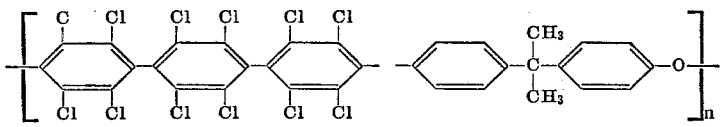

What is claimed is:

1. A normally solid polymer containing principally repeating units of the structure —A—Ar—A'—Ar'— wherein —A— and —A'— are selected from the class consisting of —O— and —S—, —Ar— is perchlorobiphenylene, and wherein —Ar'— is at least one divalent group containing from 6 to 24 aromatic carbon atoms wherein any bridges between aromatic nuclei are not more than one atom, the polymer having an inherent viscosity of at least 0.3 as measured from a solution of 0.5 g. of polymer in 100 ml. of a solvent of the group consisting of benzene, dimethylacetamide and hexamethylphosphoramide at a temperature in the range of 30° C. to 35° C.

2. The polymer of claim 1 wherein any bridges in the —Ar'— group are selected from the class consisting of —O—, —S—,

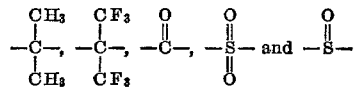

3. The polymer of claim 2 wherein —Ar'— is selected from the class consisting of

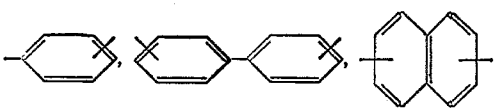

and

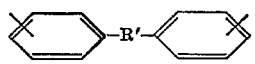

wherein R' is selected from the class consisting of —O—, —S—,

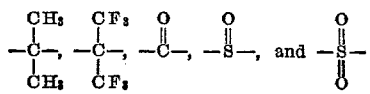

4. The polymer of claim 3 wherein —A— and —A'— are —O—.

5. The polymer of claim 4 wherein —Ar'— is

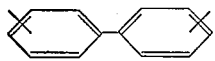

6. The polymer of claim 4 wherein —Ar'— is

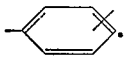.

7. The polymer of claim 4 wherein —Ar'— is

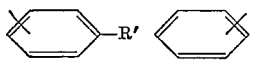

wherein —R'— has the bridge structure defined in claim 3.

8. The polymer of claim 7 wherein —R'— is

9. The polymer of claim 7 wherein —R'— is

10. The polymer of claim 7 wherein —R'— is

11. The polymer of claim 7 wherein —R'— is

12. The polymer of claim 1 wherein —Ar'— is

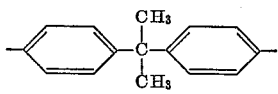

and —A— and —A'— is —O—.

References Cited
UNITED STATES PATENTS 3,622,541  11/1971  Darson et al. _____ 260—61

MELVIN GOLDSTEIN, Primary Examiner

U.S. Cl. X.R.

260—47 R, 49, 63, 79, 79.3 M